3,345,405
1-AMINO-2(AND 3)-PHENYLCYCLOBUTANE-1-
CARBOXYLIC ACIDS
Alfred Burger, Charlottesville, Va., assignor to Smith
Kline & French Laboratories, Philadelphia, Pa., a corporation of Pennsylvania
No Drawing. Filed Mar. 31, 1964, Ser. No. 356,063
8 Claims. (Cl. 260—518)

ABSTRACT OF THE DISCLOSURE

The compounds are 1-aminocyclobutane-1-carboxylic acids having a phenyl or substituted phenyl group in the 2 or 3 position. They are prepared from phenylcyclobutanedicarboxylic acid esters by steps including partial hydrolysis to give the monoester and converting the carboxylic acid group to an amino group. The compounds have hypotensive activity.

---

This invention relates to new 1-amino-2(and 3)-phenylcyclobutane-1-carboxylic acids having pharmacodynamic activity, in particular having hypotensive activity.

The compounds of this invention may be represented by the following formula:

Formula I

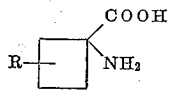

in which R is phenyl, halophenyl, lower alkylphenyl, lower alkoxyphenyl, hydroxyphenyl, methylenedioxyphenyl, dihalophenyl, di-lower alkylphenyl, di-lower alkoxyphenyl and di-hydroxyphenyl.

By the terms "lower alkyl" and "lower alkoxy" where used herein groups having from 1–4, preferably 1–2, carbon atoms are indicated.

This invention also includes pharmaceutically acceptable salts of the amino acids of Formula I. These salts may involve either the amino group or the carboxylic acid group. Exemplary of the former are the hydrochloride, hydrobromide or sulfate salts and of the latter are the sodium, potassium or calcium salts. These salts are formed by treating the amino acid in a solvent such as water or a lower alkanol with the appropriate acid or base. The amino acids of Formula I having both an amino and a carboxylic acid group can exist as zwitterions.

The compounds of Formula I may exist as cis and trans isomers and as $d$ and $l$ isomers. It is intended to include in this invention all of these isomers, the separated cis and trans isomers and the resolved $d$ or $l$ isomers as well as the mixtures thereof.

The 1-amino-2(and 3)-phenylcyclobutane-1-carboxylic acids of this invention are prepared by partial hydrolysis with one equivalent of an alkali metal hydroxide, preferably potassium hydroxide, of the corresponding phenylcyclobutanedicarboxylic acid esters having the formula:

Formula II

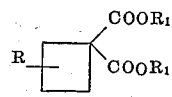

in which:

R is phenyl, halophenyl, lower alkylphenyl, lower alkoxyphenyl, methylenedioxyphenyl, dihalophenyl, di-lower alkylphenyl and di-lower alkoxyphenyl; and
$R_1$ is methyl or ethyl.

Since the more readily hydrolyzed ester group of the 2-phenylcyclobutanedicarboxylate esters is that which is trans to the sterically hindering phenyl group, the resulting monoester is primarily the trans (phenyl to carboxyl) isomer. Partial hydrolysis of the 3-phenylcyclobutanedicarboxylic esters gives mixtures of the cis and trans isomers which can be separated by fractional crystallization from an appropriate solvent.

To prepare the amino acids of this invention, the monoester is reacted with a lower alkyl haloformate, such as ethyl chloroformate, to give the corresponding mixed anhydride which is treated with sodium azide. The resulting azide is heated in an organic solvent such as toluene or xylene and the resulting isocyanate is hydrolyzed by treating with aqueous mineral acids such as hydrochloric acid or with bases such as an alkali metal hydroxide or, alternatively, the isocyanate is treated with an alcohol to give a urethan which is hydrolyzed to give the 1-amino-2(and 3)-phenylcyclobutane-1-carboxylic acids of this invention. This procedure, which is useful for the preparation of the cis-(phenyl to carboxyl) amino acids from the trans monoester, as applied to the preparation of the 2-phenyl compounds may be represented as follows:

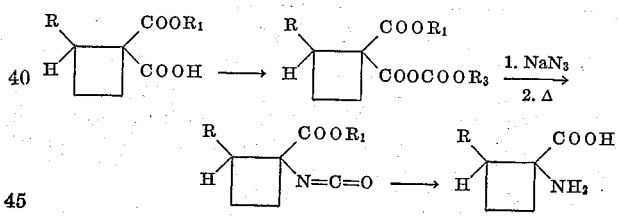

The terms R and $R_1$ are as defined in Formula II and $R_3$ is lower alkyl.

Alternatively, the amino acids of this invention are prepared by reacting the monoester, preferably the methyl ester, in the form of an alkali metal salt, for example the sodium or potassium salt, with hydrazine to form the corresponding hydrazide. Treating with nitrous acid, heating the resulting acid azide to form the cyclic anhydride and hydrolyzing gives the 1-amino-2(and 3)-phenylcyclobutane-1-carboxylic acid. This procedure, which is useful for the preparation of the trans(phenyl to carboxyl) amino acids from the trans monoester, as applied to the preparation of the 2-phenyl compounds may be represented as follows:

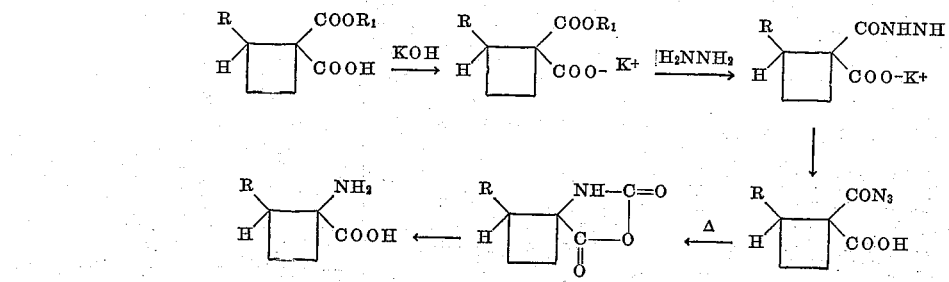
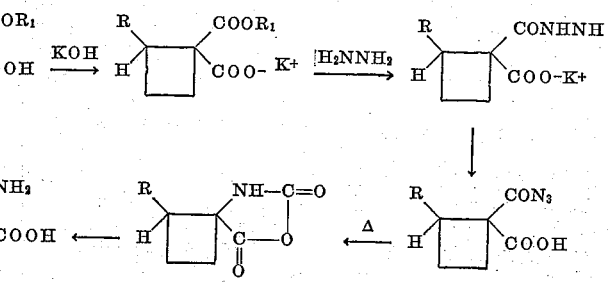

R and $R_1$ are as defined in Formula II.

The separated $d$ and $l$ isomers of the compounds of this invention are prepared by fractional crystallization of the $d, l$ mixture of salts of the products such as the tartrate, dibenzoyltartrate, acetyltryptophan or brucine salts.

The compounds of Formula I in which R is hydroxypheny lor di-hydroxyphenyl are prepared by demethylating, for example with hydrobromic acid, hydrochloric acid or pyridine hydrochloride, the corresponding methoxyphenyl or di-methoxyphenyl compounds.

The phenylcyclobutanedicarboxylate esters which are the starting materials of the above described procedures for preparing the amino acids of this invention are prepared as follows:

The 2-phenylcyclobutane-1,1-dicarboxylate esters are prepared by reacting a cinnamyl chloride with sodium diethyl malonate to give the diethyl cinnamylmalonate. This ester is treated with hydrogen bromide and the resulting diethyl 3-bromo-2-phenylpropylmalonate is cyclized by treating with sodium hydride in dry tetrahydrofuran at about 0 to 5° C. to give the 2-phenylcyclobutane-1,1-dicarboxylate esters.

The cinnamyl chloride starting materials where not known to the art are prepared by the Perkin reaction of a benzaldehyde with malonic acid in the presence of a pyridine base to give the cinnamic acid, reduction of said cinnamic acid with lithium aluminum hydride and treatment of the resulting cinnamyl alcohol with a chlorinating agent such as thionyl chloride.

The 3-phenylcyclobutane-1,1-dicarboxylate esters are prepared by reducing a diethyl phenylmalonate, for example with lithium aluminum hydride, to give a 2-phenylpropane-1,3-diol. This diol is treated with p-toluenesulfonyl chloride and the resulting ditosylate is reacted with diethylmalonate in the presence of sodium hydride to give the 3-phenylcyclobutane-1,1-dicarboxylate esters.

The following examples are not limiting but are illustrative of compounds of this invention and will serve to make fully apparent all of the compounds embraced by the general formula given above.

EXAMPLE 1

To an ether solution of 18.40 g. of 2-phenylcyclobutane-1,1-dicarboxylic acid is added an ethereal solution of diazomethane prepared from 40 g. of nitrosomethylurea. Excess diazomethane is removed by a current of nitrogen, and the dimethyl 2-phenylcyclobutane-1,1-dicarboxylate is distilled B.P. 120–121° C. (0.5 mm.).

A solution of 18.79 g. of the above prepared diester in 100 ml. of ethanol is stirred with 4.24 g. of potassium hydroxide in a minimum of water at 26° C. overnight. The solution is heated at 50° C. for 1.5 hours and the excess solvent evaporated. The remaining residue is taken up in water, washed with ether, cooled and acidified. The colorless precipitate is recrystallized from aqueous ethanol to give trans-hydrogen methyl 2-phenylcyclobutane-1,1-dicarboxylate, M.P. 141–141.5° C.

A solution of hydrogen methyl 2-phenylcyclobutane-1,1-dicarboxylate is prepared by adding sufficient acetone to a suspension of 13.68 g. of the half ester in 11 ml. of water. The solution is cooled to 0° C. in an ice bath and 7.2 g. of triethylamine in 125 ml. of acetone is added with stirring. A solution of 8.4 g. of ethyl chloroformate in 32 ml. of acetone is added slowly at 0° C., the mixture is stirred for 30 minutes at 0° C., and a solution of 6.0 g. of sodium azide in 21 ml. of water is added dropwise. After being stirred at 0° C. for one hour, the mixture is poured into an excess of ice-water, and the oil which separates is extracted with ether and dried over magnesium sulfate. The oily residue from the evaporation of the ether is dissolved in a minimum of anhydrous toluene and heated on a steam bath until nitrogen evolution ceases. The toluene is removed and the yellow oily isocyanate ester is stirred with 20% aqueous hydrochloric acid at 25° C. overnight. Filtering and recrystallizing from ethanol-ether gives the hydrochloride salt of cis-1-amino-2-phenylcyclobutane-1-carboxylic acid, M.P. 222–229° C. (dec.).

Dissolving the hydrochloride salt in aqueous ethanol, neutralizing with sodium acetate, extracting with ethyl acetate and evaporating the solvent from the extracts in vacuo gives cis-1-amino-2-phenylcyclobutane-1-carboxylic acid.

Treating the above prepared amino acid with an excess of aqueous potassium hydroxide gives the potassium salt of cis-1-amino-2-phenylcyclobutane-1-carboxylic acid.

EXAMPLE 2

Hydrogen ethyl 3-phenylcyclobutane-1,1-dicarboxylate is prepared from the diethyl ester as described in Example 1. The half ester is recrystallized from high boiling ligroin to yield colorless crystals, M.P. 107–108.5° C.

By the procedure of Example 1 the above prepared half ester is treated with ethyl chloroformate and the resulting mixed anhydride is treated with sodium azide. The resulting acid azide is heated in toluene to give the isocyanate ester which is stirred with 20% aqueous hydrochloric acid at 25° C. for 16 hours to give 1-amino-3-phenylcyclobutane-1-carboxylic acid hydrochloride.

A solution of the above prepared hydrochloride salt in aqueous ethanol is treated with sodium carbonate to give 1-amino-3-phenylcyclobutane-1-carboxylic acid. Treating this amino acid with aqueous sulfuric acid gives the sulfate salt of 1-amino-3-phenylcyclobutane-1-carboxylic acid.

1 - amino - 3 - phenylcyclobutane-1-carboxylic acid is treated with an excess of sodium hydroxide in aqueous solution to give the sodium salt.

EXAMPLE 3

Dry hydrogen chloride is passed vigorously through a solution of 3,4-methylenedioxycinnamyl alcohol in 40 ml. of chloroform at 0° C. for 10 minutes. The solution is poured immediately into ice-water, the organic layer is washed once with chloroform and the combined chloroform solutions are washed quickly with ice-water, 2% sodium bicarbonate solution and again with water. The chloroform extract is dried over magnesium sulfate and evaporated to give 3,4-methylenedioxycinnamyl chloride.

3,4-methylenedioxycinnamyl chloride, prepared from 55 g. of 3,4-methylenedioxycinnamyl alcohol, is added to a solution of diethyl sodio malonate [from 56 g. of diethyl malonate and 14 g. of sodium hydride (53% in mineral oil)] in 100 ml. of dimethyl sulfoxide and the solution stirred at 26° C. for 13 hours. The resulting suspension is poured into 1.5 l. of water, extracted three times with ether, the ether extracts are washed with water and dried over sodium sulfate. The crude ester is flushed through a column of neutral alumina with dry ether and distilled to give diethyl (3,4-methylenedioxycinnamyl) malonate.

Dry hydrogen bromide is passed through the above prepared cinnamyl malonate ester over a period of two hours keeping the temperature at about 40–45° C. Ice water is added and the mixture is extracted with a mixture of benzene and ether. The benzene solution is washed with water and ice-cold 2% sodium bicarbonate solution and dried over sodium sulfate. The solvent is removed in vacuo and the product is diethyl [3-bromo-3-(3,4-methylenedioxyphenyl)propyl]malonate.

To a suspension of 4.8 g. sodium hydride in 100 ml. of tetrahydrofuran is added under nitrogen slowly with stirring and cooling 40 g. of diethyl [3-bromo-3-(3,4-methylenedioxyphenyl)propyl]malonate in 100 ml. of tetrahydrofuran at 0–5° C. over a period of 50 minutes. The mixture is allowed to stand at 20° C. for 16 hours, then concentrated and treated with ice and water. The organic layer is separated, washed with water and the solvent removed and the residue is distilled to give diethyl 2-(3,4-methylenedioxyphenyl)-cyclobutane-1,1-dicarboxylate.

By the procedure of Example 1 the above prepared diester is treated with aqueous potassium hydroxide to give hydrogen ethyl 2-[3,4-methylenedioxyphenyl)cyclobutane-1,1-dicarboxylate which is treated with ethyl chloroformate and then sodium azide to give the isocyanate. Hydrolysis of the isocyanate with aqueous hydrochloric acid gives 1-amino-2-(3,4-methylenedioxyphenyl)cyclobutane-1-carboxylic acid.

EXAMPLE 4

To a suspension of 47.5 g. of lithium aluminum hydride in 1 l. of anhydrous ether in a nitrogen atmosphere is added dropwise 305.5 g. of diethyl (3,4-methylenedioxyphenyl)malonate over a period of five hours. The solution is refluxed for 20 hours, cooled in an ice-salt bath and decomposed with 770 g. of ammonium sulfate in 1500 ml. water. The ether layer is removed and the aqueous layer extracted twice with ether. 2-(3,4-dimethoxyphenyl)propane-1,3-diol is isolated by continuous extraction of the aqueous suspension from the reduction with chloroform for 48 hours, evaporation of the chloroform and recrystallization from benzene.

A solution of 40 g. of 2-(3,4-dimethoxyphenyl)propane-1,3-diol in 200 ml. of dry pyridine is cooled to 0° C. and 80 g. of p-toluenesulfonyl chloride is added keeping the temperature below 10° C. The solution is left overnight at 20° C. and then poured into ice containing 300 ml. of concentrated hydrochloric acid. Filtering and recrystallizing from absolute ethanol gives 2-(3,4-dimethoxyphenyl)propane-1,3-diol ditosylate, M.P. 112.5–114.5° C.

To a solution of 88.3 g. of 2-(3,4-dimethoxyphenyl)propane-1,3-diol ditosylate and 30.20 g. of diethyl malonate in 600 ml. of dioxane at 100° C. is added over three hours 7.65 g. of 53.3% sodium hydride in mineral oil. The mixture is refluxed for three hours and then an additional 7.65 g. of sodium hydride is added. The mixture is refluxed an additional 15 hours and the solvent removed. The diethyl 3-(3,4-dimethoxyphenyl)cyclobutane-1,1-dicarboxylate is extracted from the residue with ether, washed with water and dried. It is purified partially before distillation by passing through an alumina column with ether. The diester is a colorless oil, B.P. 178–181° C. (0.2 mm.).

Hydrogen ethyl 3-(3,4-dimethoxyphenyl)cyclobutane-1,1-dicarboxylate is prepared from the diethyl ester as described in Example 1. Treating this half ester with ethyl chloroformate, then with sodium azide and heating the resulting acid azide in toluene gives the isocyanate.

A mixture of 3.5 g. of the isocyanate and 3.5 g. of benzyl alcohol is heated at 100° C. for two hours. Excess benzyl alcohol is distilled under vacuum and the crude urethane is hydrogenated with 500 mg. of 10% palladium-on-charcoal in ethyl acetate. After hydrogen absorption ceases, the solution is filtered and the filtrate stirred with 1 g. of potassium hydroxide in 95% ethanol for five hours. The ethanol is evaporated and the residue triturated with acetone and filtered. The residue is dissolved in a minimum of water, filtered and neutralized to pH 6.5 with concentrated hydrochloric acid. The precipitate is filtered to yield 1-amino-3-(3,4-dimethoxyphenyl)cyclobutane-1-carboxylic acid, M.P. 240–245° C.

EXAMPLE 5

A suspension of 5 g. of 1-amino-3-(3,4dimethoxyphenyl)cyclobutanecarboxylic acid, prepared as in Example 4, in 50 ml. of 48% hydrobromic acid is stirred and refluxed for five hours. The solution is concentrated and the residue is taken into 10 ml. of water. The aqueous solution is adjusted to pH 7 with a saturated solution of sodium acetate. Filtering and recrystallizing from water gives 1-amino-3-(3,4-dihydroxyphenyl)cyclobutanecarboxylic acid hemihydrate, M.P. 254–255° C.

EXAMPLE 6

A mixture of 35.0 g. of 4-chlorocinnamic acid in tetrahydrofuran is added dropwise to a suspension of 15.0 g. of lithium aluminum hydride in 75 ml. of tetrahydrofuran. After refluxing for 10 hours, the mixture is treated with ethyl acetate-ether and then with water. The mixture is filtered and the filtrate is distilled to give 4-chlorocinnamyl alcohol. Treating 24.0 g. of this alcohol with 100 ml. of thionyl chloride, refluxing on a steam bath for eight hours and distilling gives 4-chlorocinnamyl chloride.

Diethyl malonate (16.4 g.) is added during 30 minutes to hot ethanol (75 ml.) containing 2.1 g. of sodium. 4-chlorocinnamyl chloride (17.5 g.) is added. After refluxing for two hours, the mixture is concentrated and poured into water. The oily layer is separated and distilled to give diethyl 4-chlorocinnamylmalonate.

Dry hydrogen bromide is passed over 31.0 g. of diethyl 4-chlorocinnamylmalonate for two hours maintaining the temperature at 40–55° C. The crude product is treated with ice water and extracted with benzene. The benzene extracts are washed with water and with cold sodium bicarbonate solution and evaporated in vacuo to give, as the residue, diethyl [3-bromo-3-(4-chlorophenyl)propyl]malonate.

To a suspension of 24 g. of sodium hydride in 1 liter of tetrahydrofuran is added slowly, with stirring and cooling under a nitrogen atmosphere, the above prepared bromo ester in 100 ml. of dry tetrahydrofuran at 0–5° C. The mixture is stirred and allowed to warm to about 25° C. over 11 hours and is then concentrated in vacuo. Ice and water are added to the residue. Working up as in Example 3 gives diethyl 2-(4-chlorophenyl)cyclobutane-1,1-dicarboxylate.

By the procedure of Example 1 the above prepared diester is treated with aqueous potassium hydroxide to give hydrogen ethyl 2-(4-chlorophenyl)cyclobutane-1,1-dicarboxylate. Treating this half ester with ethyl chloroformate then with sodium azide, heating with resulting azide and treating the resulting isocyanate with aqueous hydrochloric acid as in Example 1 gives 1-amino-2-(4-chlorophenyl)cyclobutane-1-carboxylic acid.

Similarly, using 4-bromocinnamic acid and 2-fluorocinnamic acid in place of 4-chlorocinnamic acid the products are 1-amino-2-(4-bromophenyl)cyclobutane-1-carboxylic acid and 1-amino-2-(2-fluorophenyl)cyclobutane-1-carboxylic acid, respectively.

EXAMPLE 7

3,4-dichlorocinnamic acid is reduced with lithium aluminum hydride in ice-cold ether and the resulting 3,4-dichlorocinnamyl alcohol is reacted with thionyl chloride to give 3,4-dichlorocinnamyl chloride. This chloride is added to a hot solution of ethyl malonate, sodium and ethanol. After refluxing for two hours and working up as in Example 6, diethyl 3,4-dichlorocinnamylmalonate is obtained.

Dry hydrogen bromide is passed into the above prepared cinnamyl compound to give diethyl [3-bromo-3-(3,4-dichlorophenyl)propyl]malonate. This bromo ester (42.9 g.) is added slowly to a suspension of 2.4 g. of sodium hydride in tetrahydrofuran at 0–5° C. The mixture is allowed to warm to room temperature over 10 hours. After concentrating, ice and water are added. Working up as in Example 3 gives diethyl 2-(3,4-dichlorophenyl)cyclobutane-1,1-dicarboxylate.

According to the procedure of Example 1 the above prepared diester is treated with aqueous potassium hydroxide to give the half ester which is converted to the mixed anhydride with ethyl chloroformate, then to the acid azide and the isocyanate which is hydrolyzed with aqueous hydrochloric acid to give 1-amino-2-(3,4-dichlorophenyl)cyclobutane-1-carboxylic acid.

EXAMPLE 8

By the procedure of Example 3 using 2-methoxycinnamyl alcohol and 3,4-dimethoxycinnamyl alcohol in place of 3,4-methylenedioxycinnamyl alcohol the products are 1 - amino - 2(2-methoxyphenyl)cyclobutane-1-carboxylic acid and 1-amino-2-(3,4-dimethoxyphenyl)cyclobutane-1-carboxylic acid, respectively, which on treatment with 48% hydrobromic acid as in Example 5 give 1-amino-2-(2-hydroxyphenyl)cyclobutane-1-carboxylic acid and 1-amino-2-(3,4-dihydroxyphenyl)cyclobutane-1-carboxylic acid, respectively.

Similarly using 3-methylcinnamyl chloride the product is 1 - amino - 2-(3-methylphenyl)cyclobutane-1-carboxylic acid.

According to the procedure of Example 6 using the following starting materials in place of 4-chlorocinnamic acid:

2-ethylcinnamic acid
4-butoxycinnamic acid
3,4-dipropoxycinnamic acid
3,4-dimethylcinnamic acid the products obtained are:

1-amino-2-(2-ethylphenyl)cyclobutane-1-carboxylic acid
1-amino-2-(4-butoxyphenyl)cyclobutane-1-carboxylic acid
1-amino-2-(3,4-dipropoxyphenyl)cyclobutane-1-carboxylic acid and
1-amino-2-(3,4-dimethylphenyl)cyclobutane-1-carboxylic acid.

EXAMPLE 9

By the procedure of Example 4 using the following starting materials in place of diethyl (3,4-methylenedioxyphenyl)malonate:

diethyl (4-methoxyphenyl)malonate
diethyl (4-tolyl)malonate
diethyl (3-bromophenyl)malonate the products are:

1-amino-3-(4-methoxyphenyl)cyclobutane-1-carboxylic acid
1-amino-3-(4-tolyl)cyclobutane-1-carboxylic acid
1-amino-3-(3-bromophenyl)cyclobutane-1-carboxylic acid

EXAMPLE 10

A solution of 23.4 g. of trans-hydrogen methyl 2-phenylcyclobutane-1,1-dicarboxylate, prepared as in Example 1, in aqueous ethanol is treated with aqueous potassium hydroxide. The resulting potassium salt is heated with 100 ml. of 85% hydrazine hydrate and 75 ml. of ethanol on a steam bath for four hours. The resulting mixture is concentrated in vacuo and the residue is washed with toluene, then treated with water and ether and 5.0 g. of sodium nitrite. Concentrated hydrochloric acid is added slowly keeping the temperature below 0° C. The ether layer is separated, dried over magnesium sulfate and concentrated. The residue is dissolved in dry toluene, heated on a steam bath until nitrogen evolution is complete and then concentrated. The residue is stirred with 10% sodium hydroxide, then extracted with ether. The aqueous layer is acidified with concentrated hydrochloric acid and washed with ether. The aqueous solution is adjusted to pH 7 with sodium acetate. Upon cooling and filtering trans-1-amino-2-phenylcyclobutane-1-carboxylic acid is obtained.

Treating the 5.0 g. of trans-1-amino-2-phenylcyclobutane-1-carboxylic acid with an excess of d-tartaric acid in ethanol solution, fractionally recrystallizing the resulting tartrate salts and neutralizing the tartrate salts in water gives the separated d and l isomers of trans-1-amino-2-phenylcyclobutane-1-carboxylic acid.

What is claimed is:

1. A compound selected from the group consisting of an amino acid and its pharmaceutically acceptable salts, said amino acid having the formula:

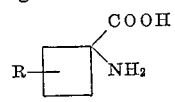

in which R is a member selected from the group consisting of phenyl, halophenyl, lower alkylphenyl, lower alkoxyphenyl, hydroxyphenyl, methylenedioxyphenyl, dihalophenyl, di-lower alkylphenyl, di-lower alkoxyphenyl and di-hydroxyphenyl.

2. A compound of the formula:

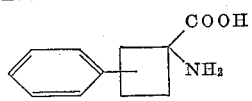

3. A compound of the formula:

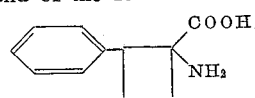

4. A compound of the formula

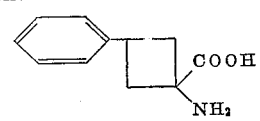

5. A compound of the formula:

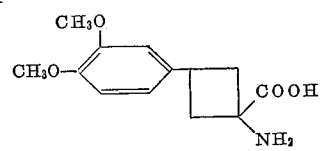

6. A compound of the formula:

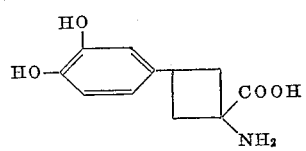

7. A compound of the formula:

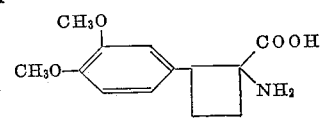

8. A compound of the formula:

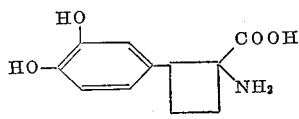

References Cited

Chemical Abstract, Beard et al. (1962), vol. 57, pp. 2082i to 2083a.

RICHARD K. JACKSON, *Primary Examiner.*

A. THAXTON, *Assistant Examiner.*